(12) United States Patent
Seidl et al.

(10) Patent No.: US 7,120,750 B1
(45) Date of Patent: Oct. 10, 2006

(54) METHOD AND SYSTEM FOR HANDLING QUEUE OVERFLOW DURING IN-CACHE GARBAGE COLLECTION

(75) Inventors: Matthew L. Seidl, Longmont, CO (US); Gregory M. Wright, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 277 days.

(21) Appl. No.: 10/826,589

(22) Filed: Apr. 16, 2004

(51) Int. Cl.
*G06F 12/08* (2006.01)
(52) U.S. Cl. ...................... 711/133; 707/206
(58) Field of Classification Search ............. 711/170, 711/133, 156; 707/206
See application file for complete search history.

(56) References Cited

U.S. PATENT DOCUMENTS 6,470,361 B1 * 10/2002 Alpern et al. ............... 707/206
6,950,838 B1 * 9/2005 Wright et al. ............... 707/206

\* cited by examiner

*Primary Examiner*—Hiep T. Nguyen
(74) *Attorney, Agent, or Firm*—Martine Penilla & Gencarella, LLP (57) ABSTRACT

In a method for handling queue overflow in an in-cache garbage collection process, a first object cache is scanned to identify live objects. If the identified live objects reside in the first object cache, then the object identifiers (OIDs) for the identified live objects are stored in a first broadcast queue associated with the first object cache. For live objects that were not processed due to an overflow of the first broadcast queue, bits are set in a register to identify portions of the first object cache that include live objects that were not processed. To locate the unprocessed live objects for processing, the first object cache is rescanned, but only the portions of the first object cache that are identified by the bits set in register are rescanned. A system for managing queue overflow in an in-cache garbage collection process carried out in a multi-processor environment also is described.

20 Claims, 4 Drawing Sheets

METHOD AND SYSTEM FOR HANDLING QUEUE OVERFLOW DURING IN-CACHE GARBAGE COLLECTION

CROSS REFERENCE TO RELATED APPLICATIONS

This application is related to 1) U.S. patent application Ser. No. 10/072,169, filed on Feb. 7, 2002, and entitled "Object-Addressed Memory Hierarchy," and 2) U.S. application Ser. No. 10/124,122, filed on Apr. 17, 2002, and entitled "Locating References and Roots for In-Cache Garbage Collection." The disclosures of these related applications are incorporated herein by reference.

BACKGROUND OF THE INVENTION

The present invention relates generally to computer systems and, more particularly, to a method and system for handling broadcast queue overflow during in-cache garbage collection.

As is known to those skilled in the art, garbage collection is the automatic management of dynamically allocated memory storage. Generally speaking, the process performing the garbage collection, i.e., the garbage collector, automatically reclaims dynamically allocated memory on a periodic basis. In addition, certain events may trigger garbage collection. For example, if the amount of unallocated memory is below a threshold value during a memory allocation process, then garbage collection may be triggered. During garbage collection, the executing program typically is suspended. The executing program is allowed to resume when garbage collection has been completed.

Before a dynamically allocated piece of memory can be reclaimed, the garbage collector must ensure that the data in the piece of memory to be reclaimed is not live. As used in the context of garbage collection, the term "live" refers to a piece of memory containing data that is required by an executing program or data that is reachable by following a path of pointers from a root, i.e., a memory location that is always deemed as live. Those skilled in the art are familiar with a number of algorithms that may be used to reclaim dynamically allocated pieces of memory. One such algorithm is the Mark-Sweep algorithm (see "John McCarthy, Recursive functions of symbolic expressions and their computation by machine, *Communications of the ACM*, 3:184–195, 1960"). The Mark-Sweep algorithm is performed in two phases. The first phase is the marking phase in which a recursive traversal is performed to find all pieces of memory connected directly or indirectly to the roots. Each piece of memory encountered in the recursive traversal is marked as live. The second phase is the sweep phase during which any piece of memory that is not marked as live is reclaimed.

During an in-cache garbage collection process, the various processors within the garbage collection (GC) boundary scan their own caches and perhaps part of any shared caches and broadcast to all caches any references to objects found to be live so that other processors can mark those objects and scan them. This marking is performed by a hardware operation that places the object identifier (OID) of the object found to be live in a queue of the cache that contains that object's header.

The length of the queue is theoretically bounded only by the number of cache lines present in the cache. It is impractical and inefficient for this hardware structure to be large enough to accommodate all the cache lines in the cache. The use of a smaller hardware structure, however, would make it likely that the queue would overflow at some point during the marking process.

In view of the foregoing, there is a need for a method for handling queue overflow during in-cache garbage collection so that a smaller-sized hardware structure can be used in the marking phase.

SUMMARY OF THE INVENTION

Broadly speaking, the present invention fills this need by providing, among other things, a hardware structure and accompanying methodology that enables queue overflow during in-cache garbage collection to be handled efficiently.

In accordance with one aspect of the present invention, a method for handling queue overflow in an in-cache garbage collection process is provided. In this method, a first object cache is scanned to identify live objects. If the identified live objects reside in the first object cache, then the object identifiers (OIDs) for the identified live objects are stored in a first broadcast queue associated with the first object cache. For live objects in the first object cache that were not processed due to an overflow of the first broadcast queue, bits are set in a register to identify portions of the first object cache that include live objects that were not processed. To locate the unprocessed live objects for processing, the first object cache is rescanned, but only the portions of the first object cache that are identified by the bits set in register are rescanned.

In one embodiment, the method further includes storing the OIDs for live objects not associated with the first object cache in broadcast queues other than the first broadcast queue. In one embodiment, before the storing of the OIDs for the live objects, the method includes broadcasting the identifiers of the live objects, with the broadcast enabling the first broadcast queue and other broadcast queues to determine whether an OID is to be stored in the first broadcast queue or one of the other broadcast queues. In one embodiment, the live OIDs stored in the first broadcast queue are from a referencing object. In one embodiment, the first broadcast queue operates as first-in-first-out (FIFO) storage. In one embodiment, cache lines of live objects in the first object cache that were not processed due to the overflow of the first broadcast queue maintain an unset done bit.

In accordance with another aspect of the present invention, a system for managing queue overflow in an in-cache garbage collection process carried out in a multi-processor environment is provided. The system includes an object cache having a broadcast queue. Overflow partition bits are associated with the object cache, with each bit in the overflow partition bits identifying a portion of the object cache. The system also includes a controller for managing the object cache. The controller is configured such that an overflow of the broadcast queue causes the controller to set a bit in the overflow partition bits. The set bit identifies the portion of the object cache that includes an object that was identified as live but not processed due to the overflow of the broadcast queue. The system further includes a processor configured to use the set bits to limit rescanning to only the portions of the object cache that include referenced but unprocessed objects.

In one embodiment, the multi-processor environment includes two or more sets of (i) an object cache, (ii) a broadcast queue, and (iii) overflow partition bits, such that scanning of any one of the object caches enables selected broadcast queues to store OIDs for the objects contained in their respective object cache. In one embodiment, each object in the object cache includes an object identifier (OID). In one embodiment, the broadcast queue operates as a first-in-first-out (FIFO) storage. In one embodiment, the overflow partition bits are in the form of a register.

In accordance with a further aspect of the present invention, another method for handling queue overflow in an in-cache garbage collection process is provided. In this method, one or more object caches is scanned. References for live objects found in the one or more object caches are broadcast. The references are stored in particular broadcast queues, such that references to objects found in one object cache are stored in a respective broadcast queue. If an overflow of any one of the broadcast queues occurs, a bit in the overflow partition bits associated with a respective object cache and broadcast queue is set. After the one or more object caches have been scanned once, only selected portions of the one or more object caches that include references that were marked but not processed are rescanned, with the selected portions of the one or more object caches being identified by set bits in the overflow partition bits associated with each respective object cache and broadcast queue.

In one embodiment, the method further includes scanning objects in the broadcast queues to find any recursive references. In one embodiment, each bit in the overflow partition bits associated with a respective object cache and broadcast queue corresponds to a non-overlapping piece of the respective object cache. In one embodiment, each non-overlapping piece of the respective object cache is of equal size. In one embodiment, before a selected portion of the one or more object caches has been rescanned, the method further includes unsetting the bit in the overflow partition bits that identifies the selected portion of the one or more object caches.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

Several exemplary embodiments of the invention will now be described in detail with reference to the accompanying drawings.

Figure 1:
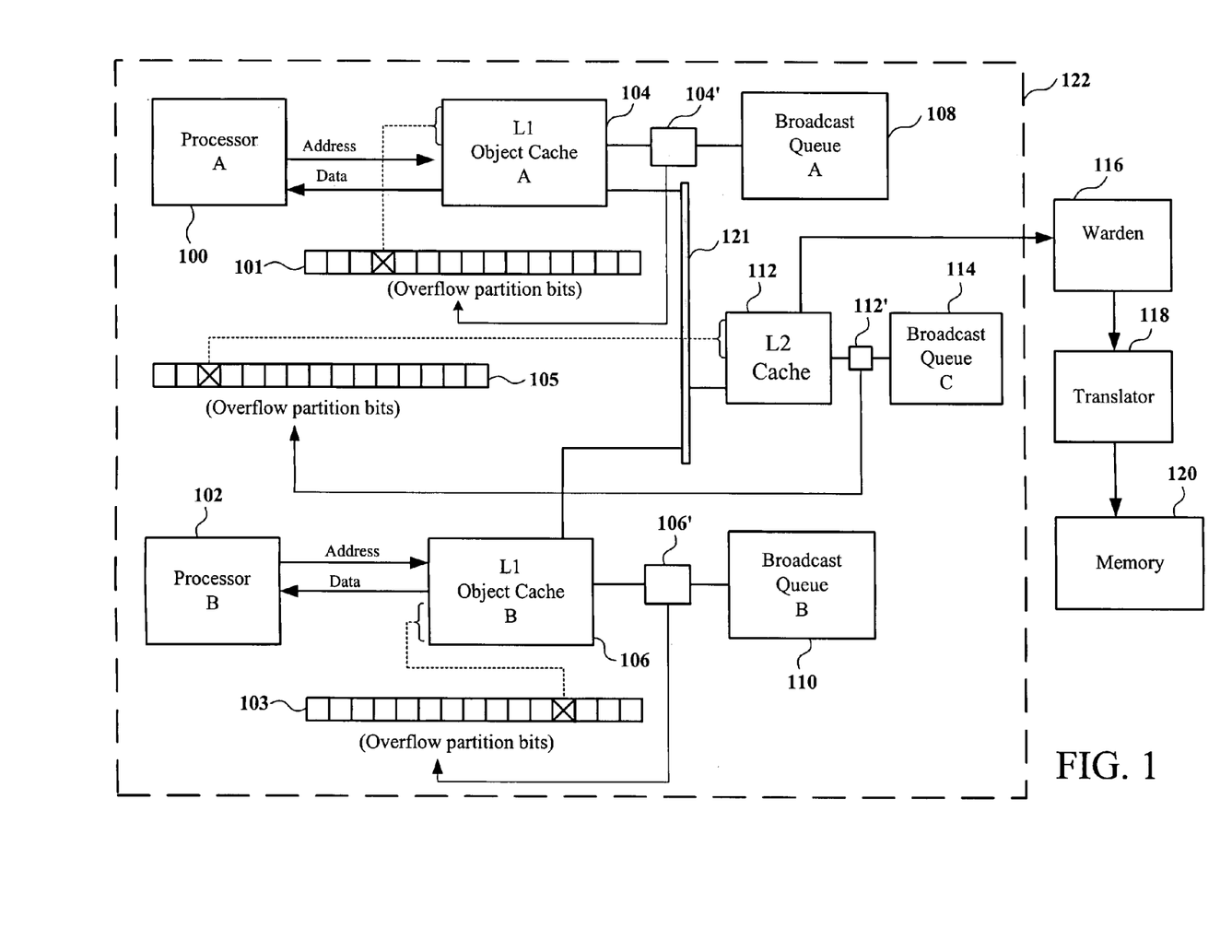
FIG. 1 is a simplified schematic diagram that illustrates an object-addressed memory hierarchy for a multiprocessor environment in accordance with one embodiment of the invention.

FIG. 1 is a simplified schematic diagram that illustrates an object-addressed memory hierarchy for a multiprocessor environment in accordance with one embodiment of the invention. As shown in FIG. 1, the object-addressed memory hierarchy includes a pair of processors (100, 102), each of which has an associated L1 cache (104, 106). Although only a pair of processors is shown in FIG. 1, it should be understood that the embodiments of the invention are applicable to multiprocessor environments that include any number of processors. Each L1 cache (104, 106) has a controller (104', 106') for managing the respective object cache. In addition, each L1 cache (104, 106) is associated with a string of overflow partition bits (101, 103) and each L1 cache has an associated broadcast queue (108, 110). The L2 cache 112, which has a controller 112' for managing the cache, is associated with the L1 caches (104, 106) and has an associated broadcast queue 114 and an associated string of overflow partition bits 105. The L1 caches (104, 106) and the L2 cache 112 communicate with one another through communication bus 121. In addition, the L2 cache 112 is associated with a warden 116, which is logically located at a garbage collection boundary 122. The warden 116 is associated with a translator 118, which is connected to memory 120.

The following description focuses on the specific functionality related to the handling of queue overflow during an in-cache garbage collection process. With the exception of the strings of overflow partition bits (101, 103, 105), additional details regarding the overall structure and functionality of the object-addressed memory hierarchy shown in FIG. 1 are described in 1) U.S. patent application Ser. No. 10/072,169, filed on Feb. 7, 2002, and entitled "Object-Addressed Memory Hierarchy," and 2) U.S. application Ser. No. 10/124,122, filed on Apr. 17, 2002, and entitled "Locating References and Roots for In-Cache Garbage Collection."

Figure 2:
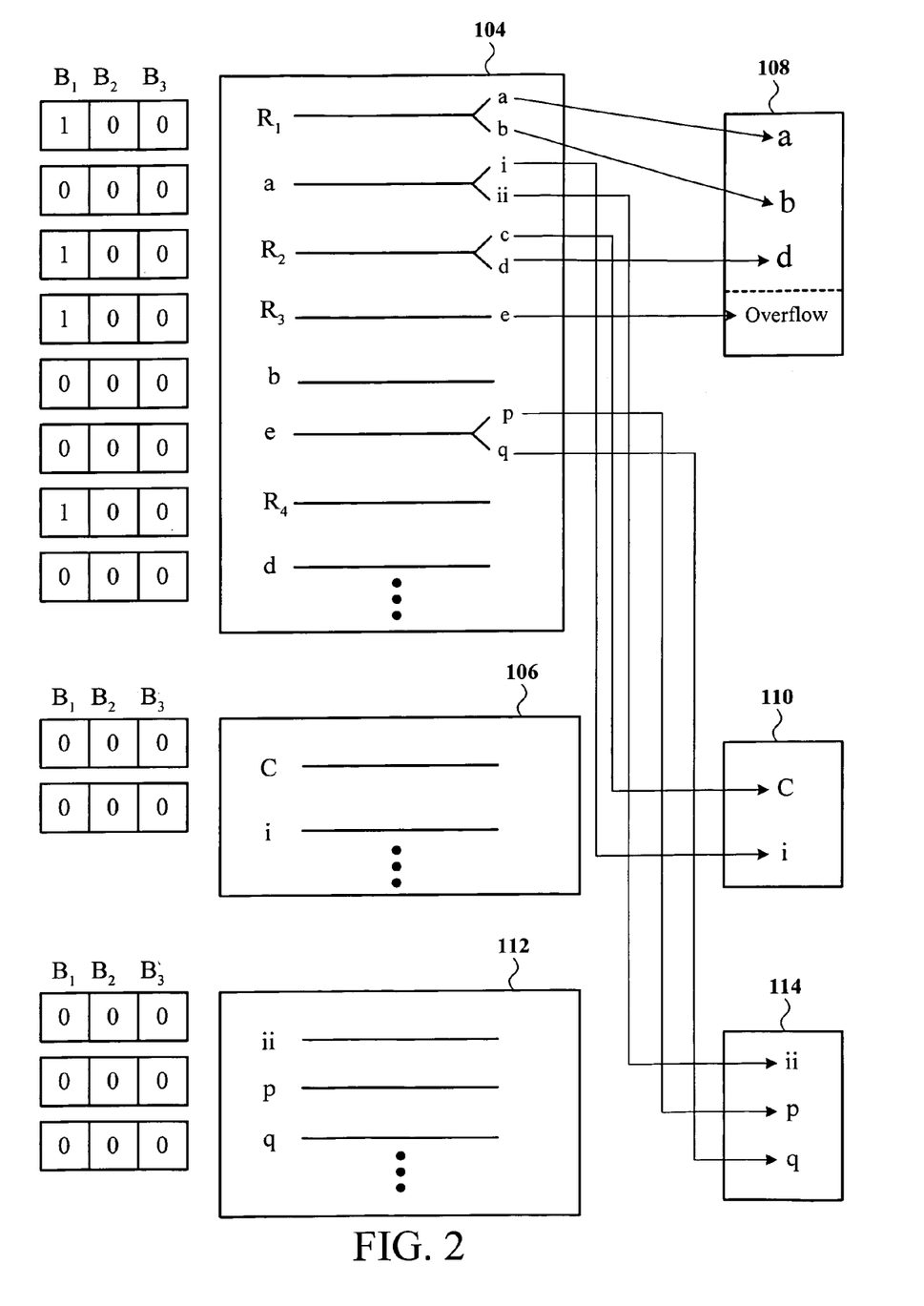
FIG. 2 is a simplified schematic diagram that illustrates the details of certain operations performed in the handling of queue overflow during an in-cache garbage collection process in accordance with one embodiment of the invention.

FIG. 2 is a simplified schematic diagram that illustrates the details of certain operations performed in the handling of queue overflow during an in-cache garbage collection process in accordance with one embodiment of the invention. During in-cache garbage collection, each processor scans the caches associated therewith to find roots, i.e., cache lines that have the non-local bit set. As shown in FIG. 2, each cache line has three bits ($B_1$, $B_2$, and $B_3$) associated therewith. The first bit, $B_1$, is the non-local bit and when set (e.g., 1=set and 0=not set) this bit identifies the cache line as being a root, i.e., a memory location that is always deemed as being live. The second bit, $B_2$, is the mark bit and the third bit, $B_3$, is the done bit. Additional details regarding the mark bit ($B_2$) and the done bit ($B_3$) will be explained below. As shown in FIG. 2, of the exemplary cache lines shown in object cache 104, the cache lines labeled as R1, R2, R3, and R4 are roots because they have the non-local bit ($B_1$) set.

During the scanning operation, each time a processor finds a root, the processor examines the contents of the cache line to find object references in the cache line and initiates a broadcast of any such references, through respective controllers 104', 106', and 112' (see FIG. 1), to all of the broadcast queues associated with the various object caches. In the case of cache line R1 shown in FIG. 2, this cache line contains references to objects "a" and "b." Accordingly, the processor will initiate the broadcast of the references to objects "a" and "b" to all of the broadcast queues, which is shown in FIG. 2 to include broadcast queues 108, 110, and 114. In the case of cache line R2, which contains references to objects "c" and "d," the processor will initiate the broadcast of the references to objects "c" and "d" to all of the broadcast queues. And in the case of cache line R3, which contains a reference to an object "e," the processor will initiate the broadcast of the reference to object "e" to all of the broadcast queues.

When a broadcast queue receives a reference via a broadcast, the broadcast queue either stores or rejects the reference depending upon whether the referenced object is found in the object cache associated with the particular broadcast queue and has not already been marked live, as explained in more detail below. The determination as to whether a referenced object is located in a particular object cache is made by the associated controller, which receives the broadcast signals. Controllers 104', 106', and 112' shown in FIG. 1 are embodied in hardware, and each controller receives the broadcast signals from the processors and determines whether to place the broadcast OID on the associated broadcast queue. With reference to FIG. 2, in the case of the references to objects "a" and "b," controller 104' will find referenced objects "a" and "b" in object cache 104, which is associated with broadcast queue 108, and therefore these references will be stored in broadcast queue 108. On the other hand, the references to objects "a" and "b" will be rejected by broadcast queues 110 and 114 because neither object "a" nor object "b" will be found in associated object caches 106 and 112 by controllers 106' and 112', respectively. In the case of the references to objects "c" and "d," controller 106' will find object "c" in associated object cache 106 and therefore the reference to object "c" will be stored in broadcast queue 110. The reference to object "d" will be stored in broadcast queue 108 because controller 104' will find object "d" in object cache 104. In one embodiment, the broadcast queues (108, 110, 114) operate as first-in-first-out (FIFO) storage.

The mark bit ($B_2$) and the done bit ($B_3$) associated with each cache line are used to track the status of each cache line during the marking phase of the in-cache garbage collection process. When a reference in a cache line is stored in one of the broadcast queues, the mark bit ($B_2$) for the referenced object is set to indicate that the referenced object is live only for purposes of the ongoing garbage collection process. When it is confirmed that the contents of the cache line have been examined, the done bit ($B_3$) is set to indicate that the processing of the particular cache line has been completed.

In situations where no overflow occurs, once the processor has found all the roots in the associated object cache and all the references in the roots have been broadcast to the broadcast queues, the processor proceeds to process the references stored in the associated broadcast queue for recursive references, i.e., indirect references from the roots. With reference to FIG. 2, in the case of the reference to object "a," which is the first item stored in broadcast queue 108, the processor removes this reference from the broadcast queue and scans the cache line in object cache 104 that contains object "a" for references to other objects. As shown in FIG. 2, object "a" contains references to objects "i" and "ii" and thus, upon scanning object "a," the references to objects "i" and "ii" will be broadcast to the broadcast queues in the same manner described above. The reference to object "i" will be stored in broadcast queue 110 because object "i" is found in object cache 106. The reference to object "ii" will be stored in broadcast queue 114 because object "ii" is found in object cache 112.

Once the reference to object "a" has been processed, the processor will continue to process the remaining references stored in the associated broadcast queue. As shown in FIG. 2, the remaining references include the references to objects "b" and "d." Similar processing is performed by the processor(s) associated with the other broadcast queues. For example, in the case of the reference to object "c," which is the first item stored in broadcast queue 110, the processor removes this reference from the broadcast queue and scans the cache line in object cache 106 that contains object "c" for references to other objects in the same manner as described above. This processing continues until the termination condition is reached, i.e., all the broadcast queues are empty. When all the broadcast queues are empty, any object that has not been marked as being live is not reachable from the roots and is therefore considered dead for purposes of the ongoing garbage collection process.

In situations where an overflow occurs, the strings of overflow partition bits described above with reference to FIG. 1 (see reference numerals 101, 103, 105) are used to handle efficiently the overflow situation. Referring to FIG. 2, assume that broadcast queue 108 is full when the references to objects "a," "b," and "d" are stored therein. As such, in the case of cache line $R_3$, when the reference to object "e" contained in cache line $R_3$ is broadcast to all of the broadcast queues, broadcast queue 108 will not be able to store the reference to object "e" because this queue is full. Even though the reference to object "e" is not stored in the broadcast queue, the mark bit ($B_2$) associated with object "e" is still set, but the done bit ($B_3$) is not set because the contents of object "e" still need to be examined for references to other objects. To avoid the need to perform a full scan of the object cache to locate object "e" as well as any other objects that could not be stored in the broadcast queue because of an overflow, the appropriate overflow partition bit is set, as will be explained in more detail with reference to FIG. 3.

Figure 3:
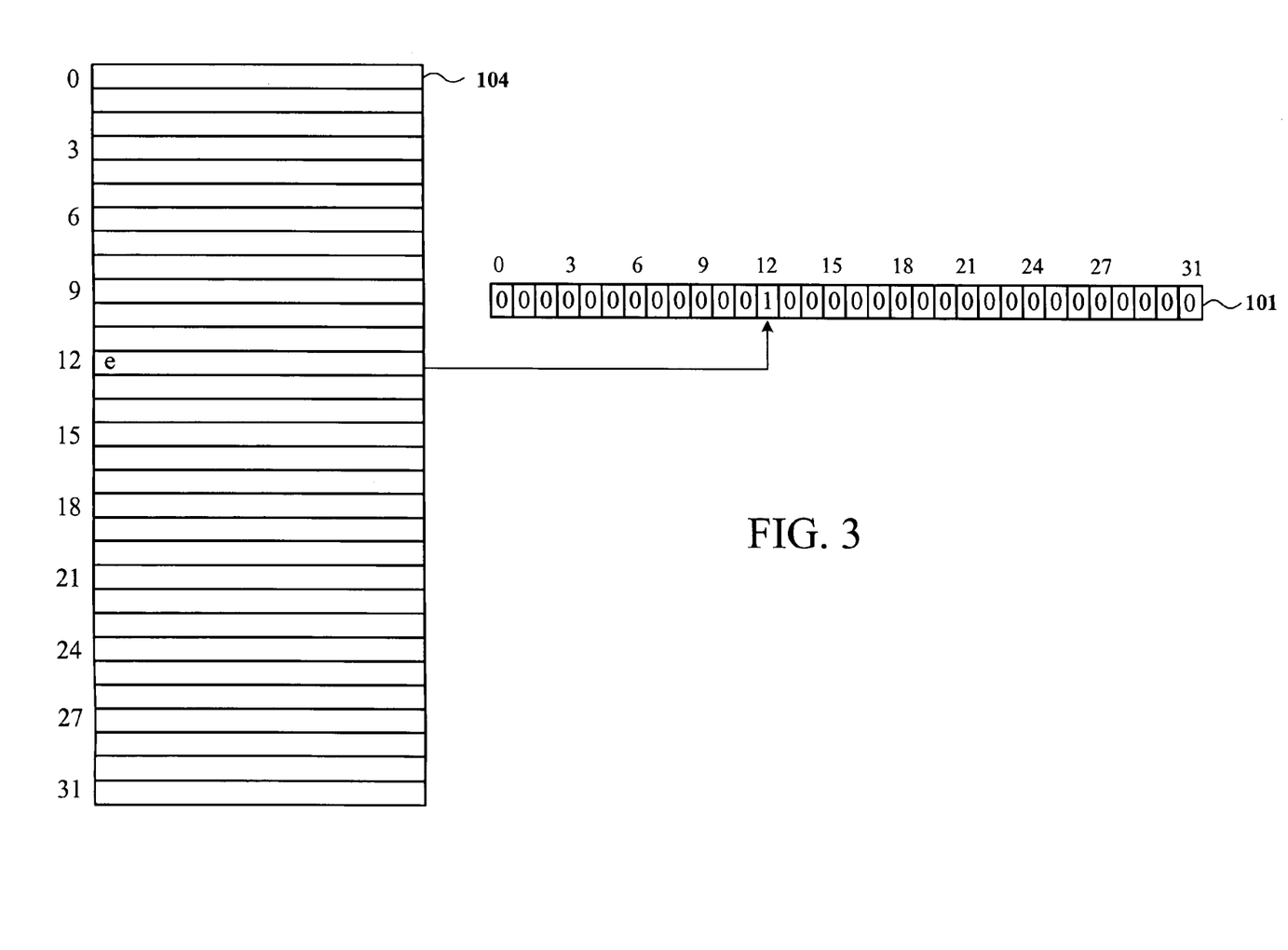
FIG. 3 is a schematic diagram that illustrates the use of the overflow partition bits to minimize the scan length required to find objects that need to be processed due to an overflow in accordance with one embodiment of the invention.

FIG. 3 is a schematic diagram that illustrates the use of the overflow partition bits to minimize the scan length required to find objects that need to be processed due to an overflow in accordance with one embodiment of the invention. As shown in FIG. 3, the string of overflow partition bits 101 is embodied in hardware in the form of a register. In one embodiment, the register has 32 bits. It will be apparent to those skilled in the art that the string of overflow partition bits may include either more bits (e.g., 64 bits, 128 bits, etc.) or fewer bits (e.g., 16 bits, 8 bits, etc.) to meet the needs of particular situations. Object cache 104 is partitioned into sections that can be identified by the individual overflow partition bits. As shown in FIG. 3, object cache 104 is partitioned into 32 non-overlapping, equal-sized portions, each of which is associated with one of the 32 bits in the string of overflow partition bits 101.

Returning to the exemplary overflow situation involving object "e" described above with reference to FIG. 2, when it is determined that the reference to object "e" cannot be stored in broadcast queue 108 because the queue is full, controller 104' sets the overflow partition bit that identifies the partition of object cache 104 in which object "e" is located. As shown in FIG. 3, object "e" is located in the partition identified as number 12 and, consequently, the overflow partition bit associated with partition number 12 is set. When the processing reaches the stage at which any unprocessed objects must be found so that the contents of such objects can be examined, the garbage collection software, which is being executed by the processor, references the overflow partition bits to determine whether any of such bits are set. In the case of the exemplary situation shown in FIG. 3, the processor (running the garbage collection software) would determine that the overflow partition bit associated with partition 12 is set, and would then proceed to scan the one or more cache lines of partition number 12 in object cache 104 to find unprocessed object "e." In this manner, the length of the scan required to find unprocessed object "e" is limited to the length of the partition in which it is located, i.e., the length of partition number 12. In contrast, without the use of the overflow partition bits described herein, it would be necessary to scan the entire object cache, which is time consuming, to find unprocessed object "e." Before the partition is scanned, the overflow partition bit is cleared, so any additional queue overflow can be detected.

Continuing on with the description of the exemplary overflow situation, when object "e" is located during the scan of partition number 12, object "e" is processed in the same manner as described above. In other words, the contents of object "e" are examined and any references to other objects are broadcast to all of the broadcast queues. As shown in FIG. 2, object "e" contains references to objects "p" and "q" and thus, upon scanning object "e," the processor will broadcast the references to objects "p" and "q" to the broadcast queues in the same manner as described above. The references to objects "p" and "q" will be stored in broadcast queue 114 because objects "p" and "q" are found in object cache 112. Thereafter, the processor will sequentially remove the references to objects "p" and "q" from broadcast queue 114 and scan the respective cache lines in object cache 114 that contain objects "p" and "q" for references to other objects in the same manner as described above.

As noted above, the processing continues until the termination condition is reached. In situations where an overflow occurs, the termination condition occurs when all of the broadcast queues are empty and all of the strings of overflow partition bits are clear. When all of the broadcast queues are empty and all of the strings of overflow partition bits are clear, any object that has not been marked as being live is not reachable from the roots and is therefore considered dead for purposes of the ongoing garbage collection process. Although the example described herein provided for only one bit being set in the overflow partition bits 101, it should be understood that any number of bits can be set, and the setting of less than all of the bits will provide the benefit of not having to scan all of the cache lines to find the unprocessed objects.

Figure 4:
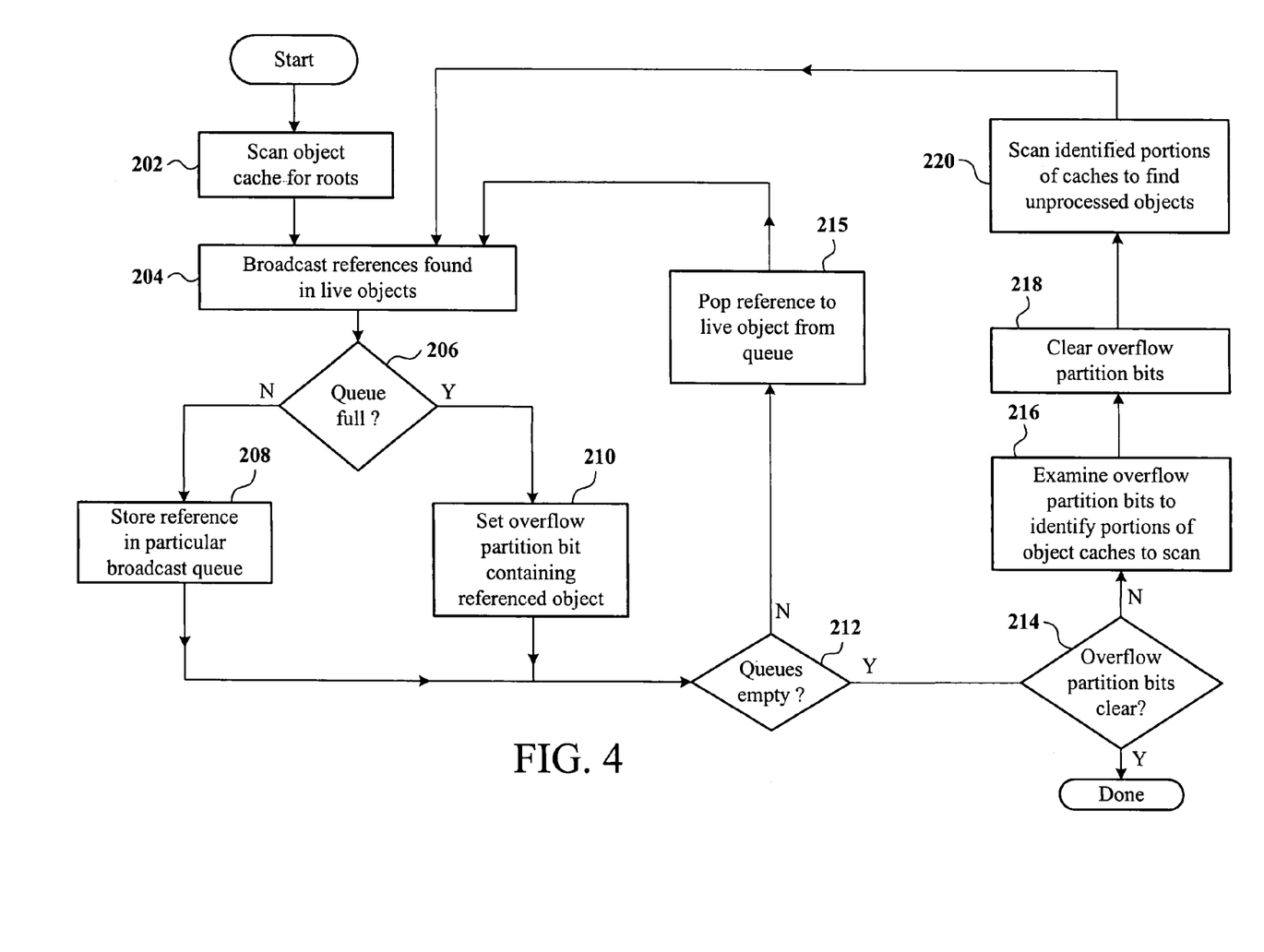
FIG. 4 is a flow chart diagram illustrating certain method operations performed in handling queue overflow in an in-cache garbage collection process in accordance with one embodiment of the invention.

FIG. 4 is a flow chart diagram 200 illustrating certain method operations performed in handling queue overflow in an in-cache garbage collection process in accordance with one embodiment of the invention. The method begins in operation 202 in which one or more object caches are scanned to find roots, i.e., memory locations that are always deemed as being live. In operation 204, any references to live objects found in the object caches (in this case object references contained in the roots) are broadcast. In one embodiment, the references are broadcast to broadcast queues associated with the object caches, e.g., broadcast queues 108, 110, 114 shown in FIGS. 1 and 2. The broadcast queues either store or reject the reference depending upon whether the referenced object is found in the object cache associated with the particular broadcast queue and has not already been marked live.

In decision operation 206, for a given reference to be stored in a broadcast queue, it is determined whether the associated broadcast queue is full. As noted above, the associated broadcast queue for a given reference is the broadcast queue that is associated with the object cache that contains the referenced object. If the broadcast queue is not full, then the method proceeds to operation 208 in which the reference is stored in the associated broadcast queue. In one embodiment, each reference is stored in the broadcast queue associated with the object cache in which the referenced object is found. On the other hand, if the associated broadcast queue is full, then the method proceeds to operation 210. In operation 210, if a reference cannot be stored because the associated broadcast queue is full, then a bit is set in a string of overflow partition bits associated with the object cache and broadcast queue to identify the portion of the object cache in which the reference is located. In one embodiment, the hardware device, e.g., a controller, that manages the object cache in which the referenced object is found sets the bit in the string of overflow partition bits. In one embodiment, the string of overflow partition bits is in the form of a register, e.g., a 32-bit register as shown in FIG. 3. In one embodiment, each bit in the string of overflow partition bits corresponds to an equal-sized, non-overlapping piece of the associated object cache, as shown, for example, in FIG. 3.

After the object caches have been scanned once to find all of the roots, the method proceeds from either operation 208 or operation 210 to decision operation 212. In decision operation 212, it is determined whether all of the broadcasting queues are empty. If some of the broadcasting queues are not empty, i.e., some queues still contain references to objects, then the method proceeds to operation 215 for continued processing of the references stored in the broadcasting queues. In operation 215, a reference to a live object is popped from one of the broadcast queues for processing. In one embodiment, for each reference stored in one of the broadcast queues, this processing includes scanning the cache line(s) in the object cache that contains the referenced object for references to other objects. The method then returns to operation 204 in which any references to other objects are broadcast to all of the broadcasting queues. On the other hand, if it is determined in decision operation 212 that all of the broadcasting queues are empty, then the method proceeds to decision operation 214.

In decision operation 214, a test is performed to determine whether the strings of overflow partition bits are clear. If the strings of overflow partition bits are not clear, i.e., the strings of overflow partition bits still include set bits, then the method proceeds to operation 216 to continue the processing of the set bits. On the other hand, if the strings of overflow partition bits are clear, i.e., the strings of overflow partition bits do not include any set bits, then the method is done.

In operation 216, the strings of overflow partition bits are referenced to identify any portions of the associated object caches that need to be scanned. As noted above, in one embodiment, each bit in the strings of overflow partition bits identifies a portion of the associated object cache. In operation 218, before each identified portion of the associated object cache is scanned, the corresponding set bit in the overflow partition bits is unset, i.e., cleared from "1" to "0." In operation 220, the identified portions of the associated object caches are scanned to find the objects that have not yet been processed due to the overflow situation. Each time an unprocessed object is located during the scanning of a selected portion of an object cache, the object is processed in the same manner as described above, i.e., the contents of the object is examined for references to other objects. If references to other objects are found, then the method returns to operation 204 so that such references can be broadcast to all of the broadcast queues.

By way of example, in the event one or more of the unprocessed objects contain references to other objects, all of the broadcast queues will not be empty until each of the references to other objects has been processed and removed from the particular broadcast queue. Thus, recursive processing will continue until the termination conditions have been reached, i.e., all of the broadcast queues are empty (as determined in decision operation 212) and all of the overflow partition bits are clear (as determined in decision operation 214). Once the termination conditions have been reached, the method is done.

Those skilled in the art will recognize that the order in which the method operations are performed may be varied from that described herein, e.g., by rearranging the order in which the method operations are performed or by performing some of the method operations in parallel. In addition, the present invention may be practiced with other computer system configurations including hand-held devices, microprocessor systems, microprocessor-based or programmable consumer electronics, minicomputers, mainframe computers, and the like.

With the embodiments described herein in mind, it should be understood that the present invention may employ various computer-implemented operations involving data stored in computer systems. These operations are those requiring physical manipulation of physical quantities. These quantities usually, but not necessarily, take the form of electrical or magnetic signals capable of being stored, transferred, combined, compared, and otherwise manipulated. Further, the manipulations performed are often referred to using terms such as producing, identifying, determining, or comparing.

Any of the operations described herein that form part of the present invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The present invention also can be embodied as computer readable code on a computer readable medium. The computer readable medium may be any data storage device that can store data which can be thereafter be read by a computer system. Examples of the computer readable medium include hard drives, network attached storage (NAS), read-only memory, random access memory, CD-ROMs, CD-Rs, CD-RWs, magnetic tapes, and other optical and non-optical data storage devices. The computer readable medium also can be distributed over network coupled computer systems so that the computer readable code is stored and executed in a distributed fashion.

In summary, the present invention provides a method and system for handling queue overflow during in-cache garbage collection. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims and equivalents thereof.

What is claimed is:

1. A method for handling queue overflow in an in-cache garbage collection process, comprising:
    scanning a first object cache to identify live objects, references to the identified live objects being stored to a first broadcast queue associated with the first object cache if the identified live objects reside in the first object cache;
    for live objects in the first object cache that were not processed due to an overflow of the first broadcast queue, setting bits in a register to identify portions of the first object cache that include live objects that were not processed; and
    rescanning the first object cache in only the portions of the first object cache that are identified by the bits set in register.

2. A method for handling queue overflow in an in-cache garbage collection process as recited in claim 1, further comprising:
    storing references to the live objects not associated with the first object cache to broadcast queues other than the first broadcast queue.

3. A method for handling queue overflow in an in-cache garbage collection process as recited in claim 2, wherein before the storing of the references to the live objects, the method comprises:
    broadcasting identification of the live objects, the broadcasting enabling the first broadcast queue and other broadcast queues to determine whether a reference to one of the live objects is to be stored in the first broadcast queue or one of the other broadcast queues.

4. A method for handling queue overflow in an in-cache garbage collection process as recited in claim 1, wherein the references to the live objects stored in the first broadcast queue are from a referencing object.

5. A method for handling queue overflow in an in-cache garbage collection process as recited in claim 1, wherein the first broadcast queue operates as first-in-first-out (FIFO) storage.

6. A method for handling queue overflow in an in-cache garbage collection process as recited in claim 1, wherein cache lines of live objects in the first object cache that were not processed due to the overflow of the first broadcast queue maintain an unset done bit.

7. A system for managing queue overflow in an in-cache garbage collection process carried out in a multi-processor environment, comprising:
    an object cache having a broadcast queue;
    a register associated with the object cache, each bit of the register identifying a portion of the object cache;
    a controller for managing the object cache, the controller being configured such that an overflow of the broadcast queue causes the controller to set a bit in the register, the set bit identifying the portion of the object cache that includes an object that was identified as live but not processed due to the overflow of the broadcast queue; and
    a processor configured to use set bits in the register to limit rescanning to only the portions of the object cache that include live but unprocessed objects.

8. A system for managing queue overflow in an in-cache garbage collection process carried out in a multi-processor environment as recited in claim 7, wherein the multi-processor environment includes two or more sets of (i) an object cache, (ii) a broadcast queue, and (iii) a register, such that scanning of any one of the object caches enables selected broadcast queues to store object references for objects contained in their respective object cache.

9. A system for managing queue overflow in an in-cache garbage collection process carried out in a multi-processor environment as recited in claim 7, wherein each bit of the register is defined as an overflow partition bit.

10. A system for managing queue overflow in an in-cache garbage collection process carried out in a multi-processor environment as recited in claim 7, wherein each object in the object cache includes an object identifier (OID).

11. A system for managing queue overflow in an in-cache garbage collection process as recited in claim 7, wherein the broadcast queue operates as a first-in-first-out (FIFO) storage.

12. A method for handling queue overflow in an in-cache garbage collection process carried out in a multi-processor environment, comprising:

scanning one or more object caches;

broadcasting references for live objects found in the one or more object caches;

storing the references in particular broadcast queues, such that references to objects found in one object cache are stored in a respective broadcast queue;

if an overflow of any one of the broadcast queues occurs, setting a bit in overflow partition bits associated with a respective object cache and broadcast queue; and after the one or more object caches have been scanned once, rescanning only selected portions of the one or more object caches that include references that were marked but not processed, the selected portions of the one or more object caches being identified by set bits in the overflow partition bits associated with each respective object cache and broadcast queue.

13. A method for handling queue overflow in an in-cache garbage collection process carried out in a multi-processor environment as recited in claim 12, further comprising:

scanning objects in the broadcast queues to find any recursive references.

14. A method for handling queue overflow in an in-cache garbage collection process carried out in a multi-processor environment as recited in claim 12, wherein each bit in the overflow partition bits is associated with a respective object cache and broadcast queue and corresponds to a non-overlapping piece of the respective object cache.

15. A method for handling queue overflow in an in-cache garbage collection process carried out in a multi-processor environment as recited in claim 14, wherein each non-overlapping piece of the respective object cache is of equal size.

16. A method for handling queue overflow in an in-cache garbage collection process carried out in a multi-processor environment as recited in claim 12, further comprising:

before a selected portion of the one or more object caches has been rescanned, unsetting the bit in the overflow partition bits that identifies the selected portion of the one or more object caches.

17. A system for managing queue overflow in an in-cache garbage collection process carried out in a multi-processor environment, comprising:

an object cache having a broadcast queue;

overflow partition bits associated with the object cache, each bit in the overflow partition bits identifying a portion of the object cache; and a controller for managing the object cache, the controller being configured such that an overflow of the broadcast queue causes the controller to set a bit in the overflow partition bits, the set bit identifying the portion of the object cache that includes an object that was marked but not processed due to the overflow of the broadcast queue; and a processor configured to use the set bits to limit rescanning to only the portions of the object cache that include marked but unprocessed objects.

18. A system for managing queue overflow in an in-cache garbage collection process carried out in a multi-processor environment as recited in claim 17, wherein the multi-processor environment includes two or more sets of (i) an object cache, (ii) a broadcast queue, and (iii) overflow partition bits, such that scanning of any one of the object caches enables selected broadcast queues to store objects contained in their respective object cache.

19. A system for managing queue overflow in an in-cache garbage collection process carried out in a multi-processor environment as recited in claim 17, wherein each object in the object cache includes an object identifier (OID).

20. A system for managing queue overflow in an in-cache garbage collection process as recited in claim 17, wherein the broadcast queue operates as a first-in-first-out (FIFO) storage.

* * * * *